United States Patent
Bickel

(10) Patent No.: US 7,444,858 B2
(45) Date of Patent: Nov. 4, 2008

(54) SENSOR APPARATUS FOR DETERMINATION OF THE TIRE INTERNAL PRESSURE FOR A MOTOR VEHICLE

(75) Inventor: Boris Bickel, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/588,519

(22) PCT Filed: Feb. 3, 2005

(86) PCT No.: PCT/EP2005/001064

§ 371 (c)(1), (2), (4) Date: Mar. 29, 2007

(87) PCT Pub. No.: WO2005/075221

PCT Pub. Date: Aug. 18, 2005

(65) Prior Publication Data

US 2007/0256487 A1 Nov. 8, 2007

(30) Foreign Application Priority Data

Feb. 6, 2004 (DE) .................. 10 2004 005 801

(51) Int. Cl.
*G01M 17/02* (2006.01)
(52) U.S. Cl. ........................................... 73/146
(58) Field of Classification Search ........... 73/146; 250/227.16
See application file for complete search history.

(56) References Cited

U.S. PATENT DOCUMENTS

| | | | | |
|---|---|---|---|---|
| 5,633,494 A | * | 5/1997 | Danisch | 250/227.16 |
| 5,682,236 A | * | 10/1997 | Trolinger et al. | 356/484 |
| 6,080,982 A | * | 6/2000 | Cohen | 250/227.11 |
| 2003/0202188 A1 | | 10/2003 | Discenzso | |

FOREIGN PATENT DOCUMENTS

| | | |
|---|---|---|
| DE | 39 37 966 C2 | 5/1991 |
| DE | 198 23 646 A1 | 12/1999 |
| DE | 102 08 998 A1 | 9/2003 |
| DE | 697 18 152 T2 | 9/2003 |
| DE | 102 18 781 A1 | 11/2003 |
| EP | 0 641 679 A1 | 3/1995 |
| EP | 0 887 211 A1 | 12/1998 |

OTHER PUBLICATIONS

International Search Report mailed Jul. 25, 2005.
German Search Report prepared Sep. 26, 2005.

* cited by examiner

*Primary Examiner*—Andre J Allen
(74) *Attorney, Agent, or Firm*—Crowell & Moring LLP

(57) ABSTRACT

A sensor apparatus for determination of a tire internal pressure for a motor vehicle by at least one measurement sensor in the form of an optical fiber, with an evaluation and computer unit deducing a sought parameter from a change in the light wave. The at least one measurement sensor detects light changes corresponding to the shape and/or size of a tire contact area as an indicator of the internal pressure in the tire.

17 Claims, 3 Drawing Sheets

SENSOR APPARATUS FOR DETERMINATION OF THE TIRE INTERNAL PRESSURE FOR A MOTOR VEHICLE

This application is a National Stage of PCT/EP2005/001064, filed Feb. 3, 2005, which claims the priority of German application No. 10 2004 005 801.6, filed Feb. 6, 2004, which are hereby incorporated in their entirety by reference.

BACKGROUND AND SUMMARY OF THE INVENTION

The invention relates to a sensor apparatus for determination of the tire internal pressure for a motor vehicle by means of at least one measurement sensor in the form of an optical fiber, with with the sought parameter being deduced from the change in the light wave.

DE 39 37 966 C2 has already disclosed sensor apparatuses such as these, in which at least one sensor detects the locally occurring deformation. Sensors are fitted in the area of the tread of the tire. This arrangement makes use of radio transmission of the measured signals from a transmitter that is arranged in the vehicle wheel to a receiver within the vehicle structure. The values are determined, for example, by means of strain gauges which are vulcanized into the tires. This is intended to allow determination not only of the tire pressure but also of longitudinal and lateral forces acting on the tire. The introduction of the measurement sensors into the tires in its own right results in considerable problems in tire manufacture.

In order to overcome the problems of the abovementioned sensor apparatus, a vehicle tire sensor apparatus which has been disclosed in DE 102 08 998 A1 uses a measurement sensor for determination of widely differing parameters relating to a tire. This measurement sensor is in the form of an optical fiber, by means of which a light wave is passed through the tire circumference. The respective changes in the reflection and transmission characteristics of the light wave allow conclusions to be drawn about the tire parameter or parameters sought. The use of optical measurement sensors such as these results in extraordinarily little complexity in tire manufacture. The already known apparatus preferably uses infrared light from the available spectral range, thus considerably reducing the damaging influence on the tire material. The use of a sensor apparatus such as this is relatively versatile.

Nevertheless efforts are being made to advantageously develop further possible applications. Particular attention is being paid to the problem of determining in particular the tire internal pressure.

Nowadays, a large number of special monitoring systems are used for measurement of the tire internal pressure, and in practice result in considerable technical complexity and significant costs.

Various monitoring systems are known for monitoring the tire internal pressure, for example those which are fitted in the rim and measure the tire pressure directly or else others which use an ABS sensor system to detect any change in the rolling circumference of the tire and in this way allow conclusions to be drawn about any pressure loss.

The object of the invention is therefore to provide a sensor apparatus for determination of a tire internal pressure for a motor vehicle of the type defined in more detail in the introduction, by means of which sensor apparatus the internal pressure of a tire can be determined in a manner which is technically as simple as possible, and cost-effective.

The invention makes use of the principle of determination of a tire internal pressure on the basis of tire deformation. If an already-known fiber sensor system is used as the measurement sensor for measurement, then it can be used directly for monitoring the tire internal pressure without any additional special sensors being required.

According to the invention, in the case of a sensor apparatus of the type referred to in the introduction, the arrangement is designed such that the measurement sensor determines the shape and/or size of the tire contact area as an indicator of the internal pressure. The shape and size of the tire contact area on the roadway are dependent on the wheel load, which fluctuates all the time while driving. However, its mean value does not fluctuate.

The influence of the wheel load on the tire internal pressure can, however, be eliminated by appropriately configured low-pass filtering in one advantageous embodiment of the invention.

If required, further data can be used to take account of wheel load changes, such as the vehicle longitudinal acceleration, the vehicle lateral acceleration, the speed and the tank volume. These contribute significantly to consideration to the changes in the wheel loads. Low-pass filtered evaluation in its own right allows a slow loss of air to be detected.

Air pressure and wheel load also determine the size and shape of the tire contact area. For example, a particularly high air pressure can lead to a fairly round contact area shape. This corresponds to an increased supporting component of the tread in the tire center.

The tire curvature transverse with respect to the direction of travel within and outside the tire contact area can also be used to determine the tire internal pressure.

The determination of the tire internal pressure by means of the tire deformation as an indicator has the advantage, particularly when using existing fiber-optic sensor systems, that there is thus no need for a special tire pressure monitoring system.

As a result of the use of optical fibers, the invention allows simple signal transmission to an evaluation and computer unit which is provided in the vehicle structure.

In principle, an optical coupler which is centered axially in the wheel is suitable for transmission of the light signal emitted from the measurement sensor to the evaluation and computer unit in the vehicle structure.

Since it can be complex in practice to pass the fiber out of the tire in conjunction with optical transmission from the rotating fiber to a non-rotating fiber in the wheel hub, it is advantageous to also vulcanize an optoelectronic evaluation unit into the tread of the tire.

A unit which has been vulcanized in such a way satisfies the requirements for compactness, weight and mechanical load capacity when, for example, it has at most a diameter of approximately 30 mm, a thickness of about 2 mm and a weight of about 10 g.

In one advantageous embodiment of the invention, an evaluation unit for fiber-optic Bragg grating systems can be used, in which the wavelength is determined by means of passive edge filters on three independent channels. A superluminescent diode (SLD) can be used as a light source. The evaluation unit may be formed from standard components, which are soldered on a board. Integration of the various components directly in the silicon material makes it possible to considerably reduce the required physical space further, and at the same time to increase the mechanical load capacity.

The sensor apparatus according to the invention can also be provided by means of so-called ASIC (active silicon integrated circuit) technology, with optical conductor tracks being produced directly in the silicon, and light sources and photodetectors being fitted. In this case, the evaluation unit is preferably in the form of a superluminescent diode (SLD) light source and a photo diode with a Mach-Zehnder interferometer for wavelength determination. In this case, the interferometer operates without any moving parts. The difference in the optical path length is produced by splitting the arriving light between two optical conductor tracks whose refractive index can be varied by electrical application of charge carriers. Since all of the required parts can be integrated in one chip, the mechanical load capacity of a system such as this is very high.

An electrical power demand for the evaluation unit of, for example, up to 1 W in the tire can be coped with by known systems, with a measurement cycle in this power range requiring a few nanoseconds.

The fact that the flexing work which has to be carried out by the tire material increases as the tire pressure decreases, particularly in the area of the tire contact area affects the fuel consumption in the same way as the risk of future tire damage. In order to take precautions against these phenomena, and, if required, as an alternative or additional option for determination of the tire internal pressure it is possible to detect the flexing work. The flexing work can in this case be detected simply by measurement of the tire temperature, for example, by means of fiber Bragg gratings (FBGs).

The invention accordingly provides for the tire temperature to be measured continuously by means of a temperature sensor, for tire heating to be detected and for flexing work to be estimated, in order to determine the difference between a nominal pressure and an actual pressure, and to avoid tire damage resulting from overheating.

Further features, details and advantages of the invention will become evident from the description, the patent claims and the drawing.

One exemplary embodiment of the sensor apparatus according to the invention for determination of a tire internal pressure for a motor vehicle is illustrated in the drawing and will be explained in more detail in the following text.

Other objects, advantages and novel features of the present invention will become apparent from the following detailed description of the invention when considered in conjunction with the accompanying drawings.

DETAILED DESCRIPTION

Figure 1:
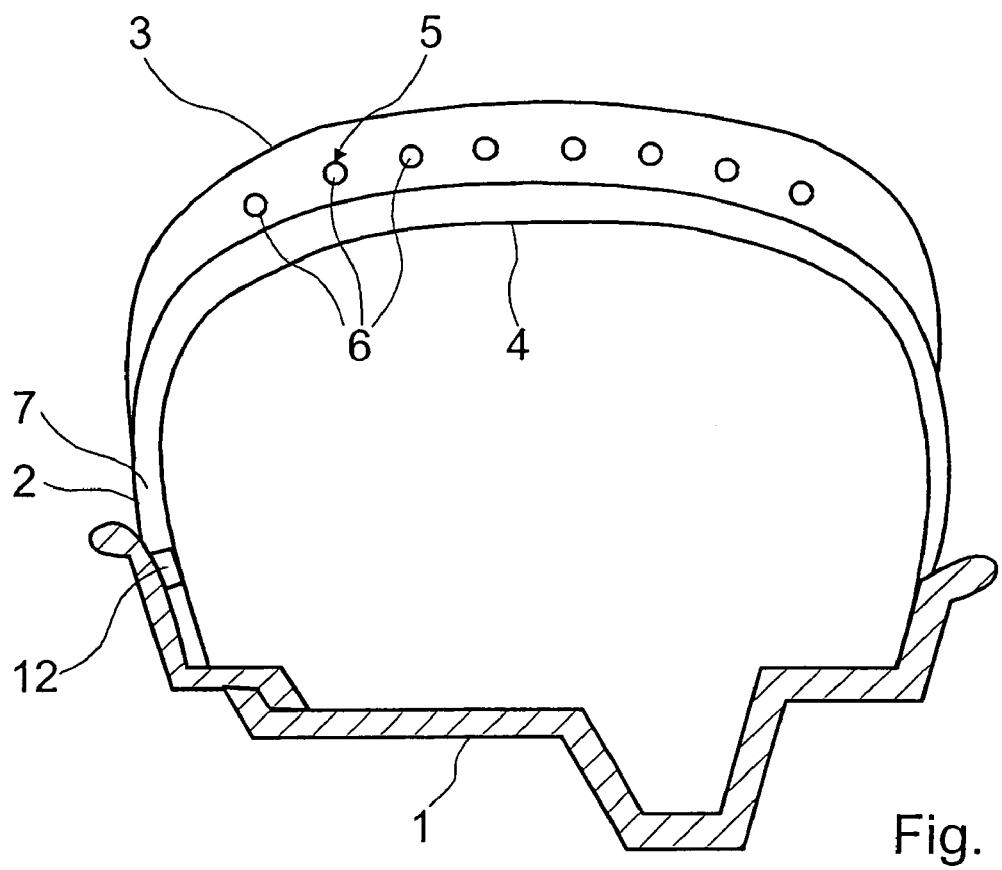
FIG. 1 shows a schematic detail of the cross section through a tire of a motor vehicle with a sensor apparatus according to the invention.

FIG. 1 shows a tire 2 which has been pulled on to a rim 1. This tire has a tread 3 whose profile is illustrated in more detail schematically in FIG. 2. The tire 2 is formed in the conventional manner with a belt, a binding and further fabric and reinforcing layers 4. A plurality of optical fibers 6 are embedded in the area of the tread 3 in the tire, run around the tire circumference and are part of a sensor apparatus 5 for determination of the tire internal pressure.

Figures 2, 3:
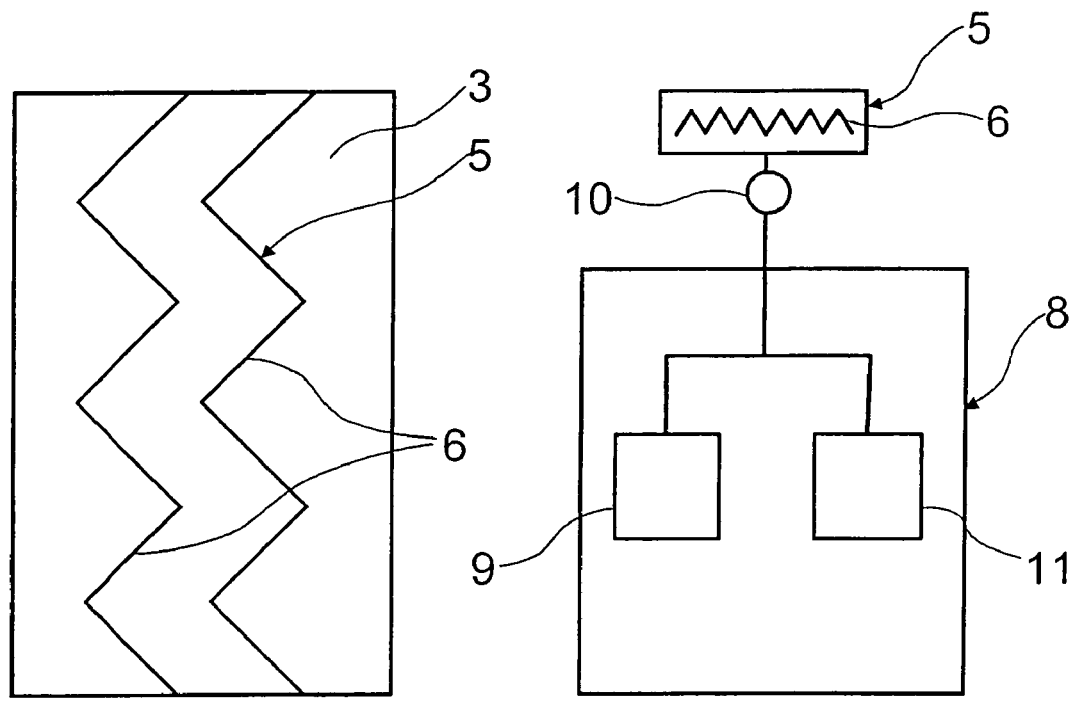
FIG. 2 shows a schematic plan view of the tread of the tire of FIG. 1.
FIG. 3 shows a block diagram of the sensor apparatus of FIG. 1.

Only two such fibers 6 are indicated, by way of example, on the tread 3 in FIG. 2. The refractive index of the optical fibers varies at a sensor element with a corresponding grating constant, that is to say, it varies at the sensor element in a periodic interval between two refractive index values. The optical fibers 6 are laid unstressed, that is to say they are neither stretched nor compressed.

In contrast to the illustrated embodiment, the optical fibers 6 may, of course, also alternatively or in addition to the arrangement on the tread 3 be fitted to a shoulder or a sidewall 7 of the tire 2.

As is shown in a highly abstracted manner and in the form of a block diagram, in FIG. 3, a signal transmitter 9 is provided on the vehicle structure 8, or may, for example, be in the form of an infrared light-transmitting light-emitting diode or an infrared laser. The incoming light signal is fed via a coupler 10, which is arranged in the wheel or directly on the tire, into the optical fibers 6 which are arranged on the tire 2. The output light signal, which varies as a result of the tire deformation at the sensor elements, is supplied via the coupler 10 to an evaluation and computer unit 11.

The arrangement of a plurality of optical fibers 6 or a plurality of sections of a fiber alongside one another, if required even in a plurality of planes, allows numerous individual sensors elements to be fitted in the tire, by means of which it is possible to determine not only the tire contact area but also further parameters. In fact, a plurality of sensor elements such as these can also be used to determine only the shape and/or size of the tire contact area.

Figures 4A, 4B, 4C:
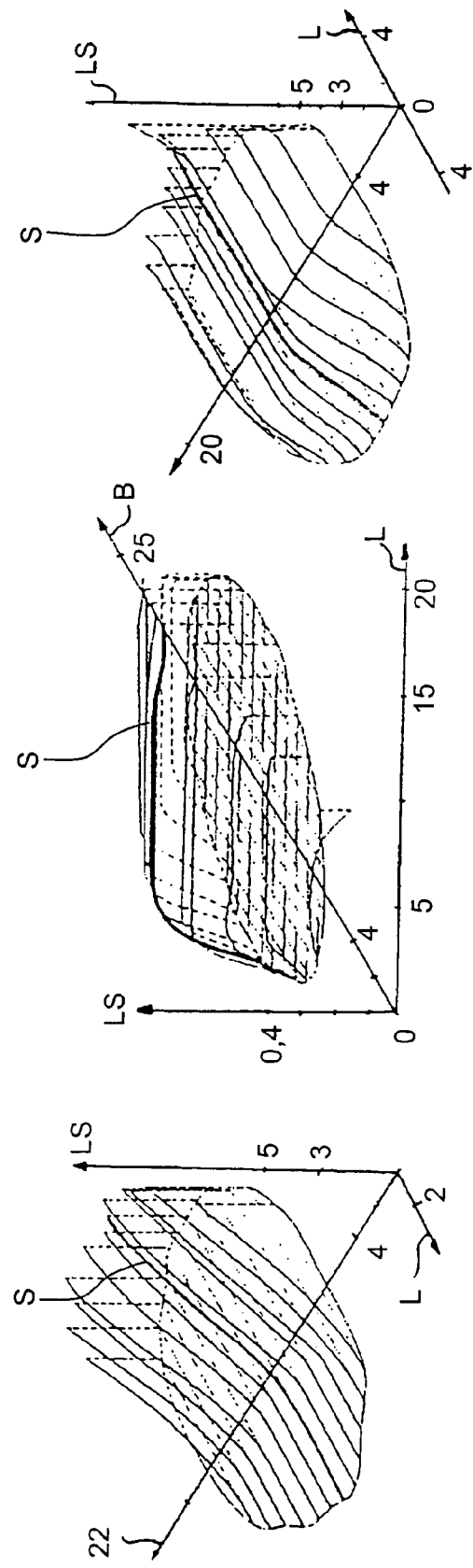
FIGS. 4a to 4c each show a graph with a tire contact area and a longitudinal slip movement distribution in three different state ranges.

The graphs shown in FIGS. 4a to FIG. 4c qualitatively show how a contact area image varies and thus how the shape and/or size of the tire contact area which govern the determination of the tire internal pressure according to the invention vary in different operating states.

FIG. 4a shows a tire contact area image of the tire 2 on the basis of a longitudinal slip movement distribution when the vehicle is being braked at a speed of 60 km/h, with a longitudinal slip movement LS in millimeters being shown plotted against a length L in centimeters and a tire width B in centimeters.

In a corresponding manner, the longitudinal slip movement distribution is shown in FIG. 4b for a vehicle in a freely rolling state at a vehicle speed of 60 km/h, while FIG. 4c shows the vehicle in a driven state at a speed of 60 km/h.

The physical change in the respective longitudinal slip movement corresponds to surface strain and at the same time strain of the optical fibers 6 which are affected by it.

The strain which occurs on the surface of the tread can be determined by formation of the differential quotient along a respective path S which is shown in FIG. 4a to FIG. 4c, of a longitudinal slip movement.

Figure 5:
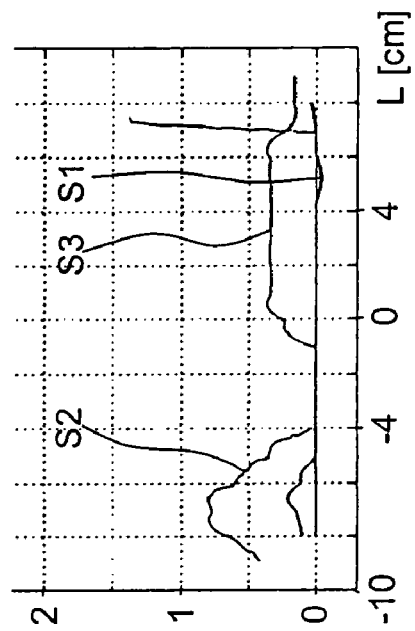
FIG. 5 shows the determination of surface strain from measured longitudinal slip movements, as shown in FIGS. 4a to 4c, in the tire contact area.
Figure 5:
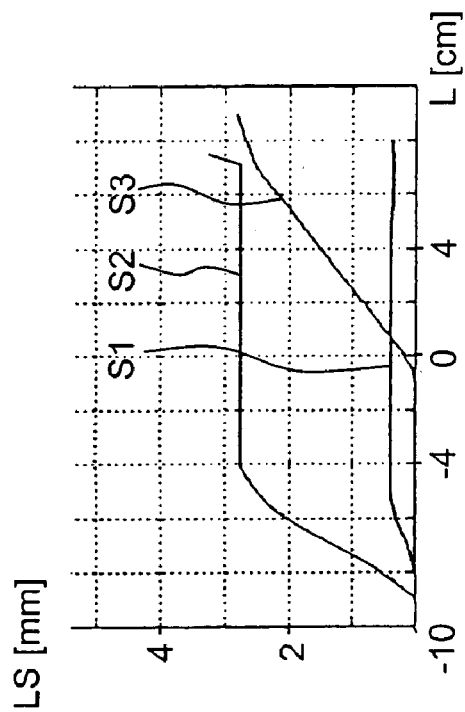

FIG. 5 shows, in the form of a graph, this differentiation for determination of the surface strain from measured longitudinal slip movements, with S1 indicating the freely rolling state, S2 the driven state and S3 the braked state. The braked state shown by the line S3 is in this case illustrated with reversed mathematical signs.

When the wheel is rolling freely, only a small amount of strain can be seen from the tire contact area impression. When the wheel is being driven, this strain is considerably greater. In addition, a further strain occurs at the end of the tire contact area. In contrast, when the vehicle is being braked compression can be seen in the rear contact area. Further investigations have shown that this statement is independent of the speed.

Conversely, it is in turn possible to use the measured strains to deduce the profile deflection, by integration and thus to detect how the entire tire contact area is split into adhesion areas and sliding areas. The ratio of the sizes of these two areas then makes it possible to deduce the current utilization level of the prevailing friction contact potential of the tire contact area.

An addition to the described determination of the tire internal pressure by measurement of the tire contact area size, the tire temperature is measured continuously by means of a temperature sensor 12 in the illustrated embodiment, so that tire heating can be detected and any flexing work can be estimated. In this way, it is possible to determine any difference between a nominal pressure and an actual pressure. This additionally makes it possible to prevent tire damage caused by overheating of the tire.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A sensor apparatus for determination of an internal pressure of a motor vehicle tire, comprising:
    at least one measurement sensor in the form of an optical fiber;
    a temperature sensor which measures a tire temperature; and
    an evaluation and computer unit,
    wherein
        when light is passed through the optical fiber and the optical fiber is stressed, the light is changed,
        the evaluation and computer unit detects changes in light passing through the optical fiber and determines at least one of the shape and size of a contact area of the tire as an indicator of the internal pressure in the tire, and
        the evaluation and computer unit detects tire heating from the temperature sensor, and a difference between a nominal pressure and an actual pressure is determined with consideration of the detected tire heating and an estimated tire flexing work.

2. The sensor apparatus as claimed in claim 1, wherein an evaluation unit uses low-pass filtering to eliminate a wheel load influence on at least one of the shape and the size of the tire contact area.

3. The sensor apparatus as claimed in claim 1, wherein the at least one measurement sensor is connected to the evaluation and computer unit by an optical transmission device.

4. The sensor apparatus as claimed in claim 1, wherein the evaluation and computer unit is arranged in the tire.

5. The sensor apparatus as claimed in claim 4, wherein the evaluation and computer unit is vulcanized into the tread of the tire.

6. The sensor apparatus as claimed in claim 1, wherein the evaluation and computer unit includes an evaluation unit for a fiber-optic Bragg grating system, and change in light wavelength is determined with passive edge filters on independent channels.

7. The sensor apparatus as claimed in claim 1, further comprising:
    a superluminescent diode as a light source for the light passed though is the optical fiber.

8. The sensor apparatus as claimed in claim 6, wherein the tire temperature is measured continuously by the temperature sensor, and tire flexing work is determined by the evaluation and computer unit from the measured tire temperature.

9. A method of determining an internal pressure of a motor vehicle tire, comprising the steps of:
    detecting a change in light passed through an optical fiber located in the tire; and
    determining with an evaluation and computer unit from the detected change in light passing through the optical fiber at least one of the shape and size of a contact area of the tire; and
    determining an indication of the internal pressure in the vehicle tire from the determined at least one of the shape and size of a contact area of the tire.

10. The method of claim 9, wherein the evaluation and computer unit uses low-pass filtering to eliminate a wheel load influence on at least one of the shape and the size of the tire contact area.

11. The method of claim 9, wherein the optical fiber is connected to the evaluation and computer unit by an optical transmission device.

12. The method of claim 9, wherein the evaluation and computer unit is arranged in the tire.

13. The method of claim 12, wherein the evaluation and computer unit is vulcanized into the tread of the tire.

14. The method of claim 9, wherein the evaluation and computer unit includes an evaluation unit for a fiber-optic Bragg grating system, and change in light wavelength is determined with passive edge filters on independent channels.

15. The method of claim 9, further comprising the steps of:
    detecting a tire temperature from a tire temperature sensor;
    determining tire heating with the evaluation and computer unit from the detected tire temperature; and
    determining a difference between a nominal tire pressure and an tire actual pressure based on consideration of the determined tire heating and an estimated tire flexing work.

16. The method of claim 9, wherein a superluminescent diode is a light source for the light passed though the optical fiber.

17. The method of claim 15, wherein the tire temperature is measured continuously by the temperature sensor, and tire flexing work is determined by the evaluation and computer unit from the measured tire temperature.

* * * * *